(12) United States Patent
Zhou et al.

(10) Patent No.: US 11,714,943 B2
(45) Date of Patent: Aug. 1, 2023

(54) PARALLEL ANALOG CIRCUIT OPTIMIZATION METHOD BASED ON GENETIC ALGORITHM AND MACHINE LEARNING

(71) Applicant: SHAN DONG UNIVERSITY, Jinan (CN)

(72) Inventors: Ranran Zhou, Jinan (CN); Yaping Li, Jinan (CN); Yong Wang, Jinan (CN); Yusong Li, Jinan (CN); Xuezheng Huang, Jinan (CN); Juanjuan Sun, Jinan (CN)

(73) Assignee: SHAN DONG UNIVERSITY, Jinan (CN)

( * ) Notice: Subject to any disclaimer, the term of this patent is extended or adjusted under 35 U.S.C. 154(b) by 564 days.

(21) Appl. No.: 16/957,998

(22) PCT Filed: Nov. 13, 2019

(86) PCT No.: PCT/CN2019/117984
§ 371 (c)(1),
(2) Date: Jun. 25, 2020

(87) PCT Pub. No.: WO2020/253055
PCT Pub. Date: Dec. 24, 2020

(65) Prior Publication Data
US 2023/0092630 A1    Mar. 23, 2023

(30) Foreign Application Priority Data
Jun. 19, 2019   (CN) .......................... 201910530806.4

(51) Int. Cl.
*G06F 30/373* (2020.01)
*G06F 30/367* (2020.01)
(Continued)

(52) U.S. Cl.
CPC .......... *G06F 30/373* (2020.01); *G06F 30/367* (2020.01); *G06N 3/126* (2013.01); *G06F 2119/02* (2020.01)

(58) Field of Classification Search
CPC .. G06F 30/373; G06F 30/367; G06F 2119/02; G06N 3/126
See application file for complete search history.

(56) References Cited

U.S. PATENT DOCUMENTS 8,554,530 B1 * 10/2013 O'Riordan .............. G06F 30/33
716/106
9,047,424 B1 * 6/2015 Baker ................... G06F 30/367
(Continued)

*Primary Examiner* — Stacy Whitmore
(74) *Attorney, Agent, or Firm* — CBM Patent Consulting, LLC

(57) ABSTRACT

A parallel analog circuit automatic optimization method based on genetic algorithm and machine learning comprises global optimization based on genetic algorithm and local optimization based on machine learning, with the global optimization and the local optimization performed alternately. The global optimization based on genetic algorithm utilizes parallel SPICE simulations to improve the optimization efficiency while guaranteeing the optimization accuracy, combined with parallel computing. The local optimization based on machine learning establishes a machine learning model near the global optimal point obtained by the global optimization, and uses the machine learning model to replace the SPICE simulator, thus reducing the time costs brought by a large number of simulations.

3 Claims, 5 Drawing Sheets

(51) Int. Cl.
*G06N 3/126* (2023.01)
*G06F 119/02* (2020.01)

(56) References Cited

U.S. PATENT DOCUMENTS

| | | | |
|---|---|---|---|
| 10,867,091 B1* | 12/2020 | Oh | G06F 30/331 |
| 11,176,298 B1* | 11/2021 | Nie | G06F 30/367 |
| 2023/0022540 A1* | 1/2023 | Sanchez | G06F 16/9535 |
| 2023/0024581 A1* | 1/2023 | Morrison | H01S 5/0225 |

* cited by examiner

PARALLEL ANALOG CIRCUIT OPTIMIZATION METHOD BASED ON GENETIC ALGORITHM AND MACHINE LEARNING

TECHNICAL FIELD

The invention is related to a parallel analog circuit optimization method based on genetic algorithm and machine learning and belongs to the technical field of artificial intelligence and integrated circuit design or computer-aided design.

BACKGROUND ART

Nowadays, the integrated circuit design has entered the era of System-on-chip (SoC). SoC generally includes two parts, analog circuit and digital circuit. Among them, the digital circuit can be designed quickly with the help of mature EDA auxiliary tools, while the analog part is mainly designed and debugged manually by the designer with the aid of SPICE and other simulation software. As there are many non-ideal factors in the design of analog circuits, manual debugging is faced with several problems, such as larger difficulty and time consuming, when there are a lot of design variables and a large design space. It is urgent to realize the automatic optimization of analog circuits in order to solve the problems existing in the process of manual debugging of such circuits.

At present, there are mainly two types of methods for automatic optimization of analog circuits: one is model-based optimization, and the other is SPICE simulation-based optimization. The model-based optimization method is generally to use the analytical model or other proxy models to evaluate the circuit performance and then optimize the circuit parameters in the design space based on such models to find the optimal design. This method has a speed advantage as the model-based computation takes far less time than the SPICE simulation. However, as the accuracy of the analytic model or other proxy models is lower than that of the SPICE simulation, there is a problem in the accuracy of this method, which often requires further processing of the optimization results. The SPICE simulation-based optimization method is to evaluate the circuit performance through the SPICE simulation of the transistor-level circuits. The SPICE simulator is an industrial-standard integrated circuit simulation tool that can accurately evaluate the circuit performance. However, the key is that SPICE simulation takes a long time. When the design variables are large in number and the search space is large, the number of simulations required will reach tens of thousands or even more times, bringing huge time costs. Therefore, the market needs an automatic analog circuit optimization method that features both better optimization accuracy and higher optimization efficiency.

DESCRIPTION OF THE INVENTION

To address the shortcomings of the existing technologies, the invention provides a parallel analog circuit optimization method based on genetic algorithm and machine learning. It has presented an analog circuit optimization method with both higher efficiency and better optimization accuracy (comparable to SPICE simulation) by combining the advantages of the model-based optimization and simulation-based optimization methods and taking into account both the efficiency and the accuracy of the analog circuit optimization.

Explanation of Terms:

1. Cost value: it is a measure of the circuit performance, and is calculated based on the circuit performance indexes obtained through SPICE simulation. The smaller the Cost value, the better the circuit performance is. The circuit performance indexes can be one or more, that is to say, this method can achieve multi-objective optimization.

2. Orthogonal Latin square principle: the Latin square is a special square matrix, where each element appears only once in each row and column. Orthogonal Latin square: In a complex matrix consisting of s Latin squares, if there is no duplicate tuple, the s squares are said to be orthogonal to each other 3. SPICE simulator: The SPICE (Simulation program with integrated circuit emphasis) is a powerful analog circuit simulator.

4. Parallel simulation technique: it uses multiple CPUs to carry out multiple SPICE simulation operations simultaneously.

5. Circuit design variables refer to the values of circuit parameters that need to be changed in a circuit, such as resistance, capacitance, and MOS transistor width (W), etc.

6. Circuit performance parameters: circuit performance values, such as gain of operational amplifier, bandwidth, phase margin, and passband ripple of complex filter, etc.

The Technical Solution of the Invention is as Follows:

A parallel analog circuit optimization method based on genetic algorithm and machine learning, which comprises global optimization based on genetic algorithm and local optimization based on machine learning, with the global optimization and the local optimization performed alternately. The global optimization based on genetic algorithm utilizes SPICE simulation to evaluate the circuit performance to achieve high accuracy, and combines with the parallel computing technique to improve the optimization efficiency. The local optimization based on machine learning establishes a circuit model based on machine learning technique near the optimal point obtained by global optimization, and conducts further optimization in the local region based on the circuit model to acquire better circuit parameters. The specific steps are as follows:

(1) Generate the initial population: Sampling is done in the design space according to the orthogonal Latin square principle and the obtained data forms the initial population. The design space refers to the value range of the circuit design variables, which is to be determined by the user. The sampling refers to the process of selecting multiple sets of variable values in the design space. The sampled data includes multiple sets of circuit design variable values, each of which contains the values of each design variable.

SPICE simulations are carried out for all the individuals in the initial population simultaneously with the SPICE simulator and combined with the parallel technique, that is to say, parallel SPICE simulations are performed. As the initial population contains multiple sets of variable values, SPICE simulations are done for each of them in order to evaluate its performance in the population, and multiple SPICE simulations are performed synchronously to obtain the circuit performance parameters of each individual in the initial population. Each set of circuit design variable values in the initial population is referred to as an individual, while each circuit performance value is referred to as a circuit performance parameter, such as gain of operational amplifier, bandwidth, and passband ripple of complex filter, etc. The circuit performance parameters are determined by the optimized target circuit.

The initial population of the genetic algorithm is generated by orthogonal Latin square sampling, which can reduce the number of individuals in the required population and have the individuals distributed as evenly as possible in the design space. Through combining SPICE simulation with parallel computing, the circuit performance of many individuals in the population is to be evaluated via parallel SPICE simulations, which has improved the efficiency greatly.

(2) Each individual's cost value is computed according to the computational formula as shown in Equation (I). Then, the individual with the lowest cost value in the population is selected as the optimal individual:

(3) Training and test data sets are generated for training machine learning-based circuit performance models:

(4) The training and test data sets obtained from Step (3) are used to train and generate the machine learning-based circuit performance model:

The training and test data sets obtained from Step (3) are used to train models. The machine learning-based circuit performance model refers to a mathematical model established in a local range near the global optimal point based on the machine learning algorithm. It can reflect the relations between circuit design variables and performance indexes. Since the said machine learning model is established in a local region, the training data required by it is less than that needed by the model built in the global scope, which thus can reduce the time costs. Additionally, as the circuit performance is relatively stable in a local region, the machine learning model established in this way has a higher accuracy, which is conductive to the improvement of the accuracy of the analog circuit optimization method. During the local optimization, the established machine learning model will be used in replacement of the SPICE simulator to evaluate the circuit performance. The machine learning model can predict much faster than SPICE simulation, and thus can greatly improve the efficiency.

(5) Local optimization is to be done based on the well trained machine learning-based circuit performance model from Step (4):

A search is carried out in the neighborhood of the optimal individual obtained by the global search, aiming to further search for points with better performance and lower cost values. Then, the circuit performance is no longer evaluated through SPICE simulation, and instead, is predicted with the well-trained machine learning-based circuit performance model from Step (4). Namely, the circuit performance model runs with the circuit design variable values as input items, and then outputs the results as circuit performance parameters. The cost value is calculated with the computational formula as shown in equation (I) based on the circuit performance parameters output by the circuit performance model. The local search is carried out in the direction where the cost value decreases.

(6) SPICE simulation verification is done for the results obtained by the local optimization of machine learning-based circuit performance model from Step (5) to improve the accuracy of the optimization results in the previous step. Then, the optimal individual in the initial population is updated with the circuit design variable values and simulation results after the SPICE simulation verification, which is to replace the original value with the current value. The SPICE simulation verification aims to improve the accuracy of the optimization results based on machine model local optimization. The local optimization results after SPICE verification are added to the next-generation population to get a better population.

(7) Determine whether the optimization termination condition is met. If the pre-set iteration times are reached or the goal of circuit optimization is met, then the optimization is finished. If not, Step (8) is entered.

(8) Enter the evolutionary process of the genetic algorithm: A new population is generated through selection, crossover and mutation. The said selection is to select excellent individuals from the population according to the cost values, namely the smaller the cost value, the more likely the individual is to be selected. The said crossover is to select a pair of individuals randomly from the population according to the pre-set probabilities, namely two sets of parameter values of the circuit are randomly selected, and then utilize the crossover operator to cross over them and generate new individuals. The said mutation is to use the mutation operator to mutate some values of the individuals in a population to produce new individuals;

(9) Parallel SPICE simulations are performed for the new population generated by Step (8) with the SPICE simulator combined with the parallel computing technique;

(10) Repeat Step (2) to Step (7).

According to a preferred embodiment of the invention, the said Step (2) is to: put the SPICE simulation results obtained from Step (1), namely the circuit performance parameters of each individual in the initial population, into the cost function and calculate the cost value $F_{cost}$ (cost value) of each individual in the population. The cost value is used to measure the circuit performance. The individual with the lowest cost value is the optimal individual of the population. The cost function $F_{cost}$ is as shown in equation (I):

$$F_{cost}=\Sigma_{n=1}^{N}(W_n*P_n) \quad (I)$$

In equation (1), N indicates the number of performance indexes to be optimized of the circuit (n=1,2, . . . N): $P_n$ indicates the square of the difference between the SPICE simulation result and the circuit performance parameter for the nth circuit performance parameter, and $w_n$ is a weight value that indicates the importance of the nth circuit performance parameter (the value of $W_n$ is to be set by the users according to needs and must be a real number).

According to a preferred embodiment of the invention, the said Step (3) is to: perform uniform sampling and obtain sample data in the neighborhood of the optimal individual selected in Step (2) through use of the orthogonal Latin square principle, wherein the neighborhood indicates a range within 5% of the circuit performance parameters of the optimal individual or a user-defined range; and conduct SPICE simulations for the sampled data in the neighborhood of the optimal individual simultaneously, namely parallel SPICE simulations, with the SPICE simulator combined with the parallel technique to obtain the simulation results. The sampled data and the simulation constitute the training and test data sets jointly. The sampled data and the simulation constitute the training and test data sets jointly. Compared to serial simulations, parallel SPICE simulations can reduce time costs and improve the optimization efficiency.

According to a preferred embodiment of the invention, the machine learning-based circuit performance model as described in Step (3) is an artificial neutral networks (ANN) model, a K-Nearest Neighbor (KNN) model, a Support Vector Machine (SVM) model, a Deep Neural Networks (DNN) model, a Decision Trees (DT) model, or a Random Forests model. An appropriate model shall be selected from them for local optimization depending on the accuracy requirements.

The invention performs global optimization based on genetic algorithm and local optimization based on machine learning alternately until the optimization goal is met after a certain times of iterations, or the preset iteration times are reached.

The Beneficial Effects of the Invention are as Follows:

1. The invention proposes a parallel analog circuit optimization method based on genetic algorithm and machine learning, which can improve the optimization efficiency significantly while achieving SPICE-level optimization accuracy.

2. The invention proposes a parallel analog circuit optimization method based on genetic algorithm and machine learning, which has improved the optimization efficiency and guaranteed the optimization accuracy through combining genetic algorithm with SPICE simulation and parallel technique.

3. The invention proposes a parallel analog circuit optimization method based on genetic algorithm and machine learning, which has improved the optimization efficiency by establishing machine learning model in local optimization and replacing SPICE simulation with machine learning model prediction. It uses SPICE for further simulation and verification of the optimization results based on machine learning model, and thus can guarantee the optimization accuracy.

4. The invention proposes a parallel analog circuit optimization method based on genetic algorithm and machine learning, which can save time costs by generating training data for the machine learning model through SPICE parallel simulations in the local optimization process.

5. The invention proposes a parallel analog circuit optimization method based on genetic algorithm and machine learning, which evaluates the individuals of the genetic algorithm population through parallel SPICE simulations in the global optimization, and obtain the training data also through parallel SPICE simulations in the local optimization. It has realized an overall parallel optimization, and has improved the efficiency while guaranteeing the optimization accuracy.

DETAILED EMBODIMENTS

The invention is further described in combination with the attached figures and embodiments as follows, but is not limited to that.

Embodiment 1

Figure 2:
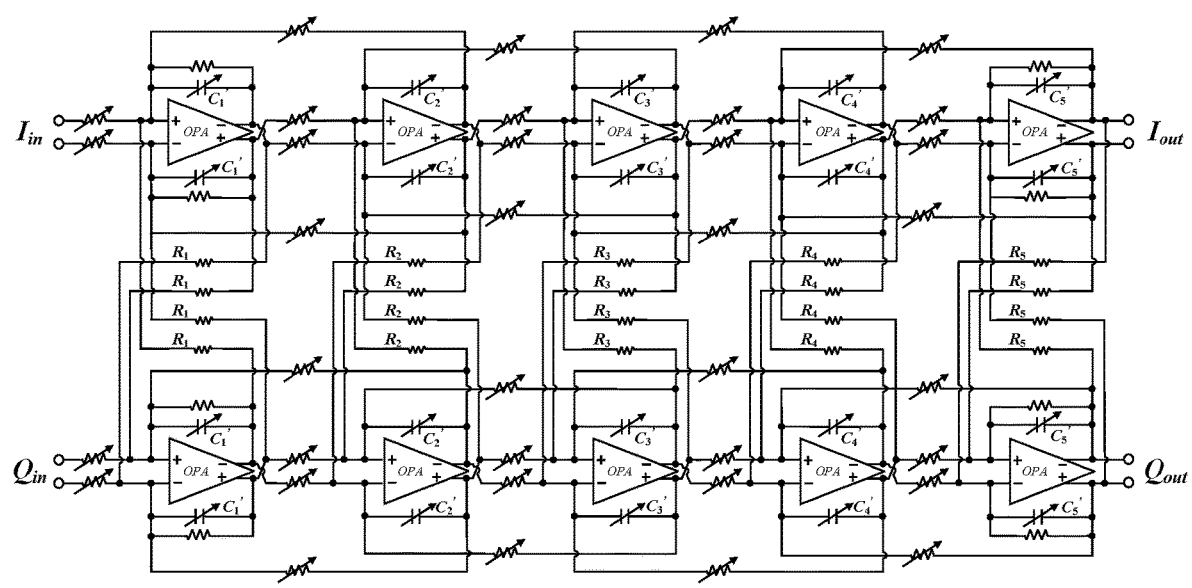
FIG. 2 shows the structure diagram of the fifth order complex bandpass filter circuit in Embodiment 1 of the parallel analog circuit optimization method based on genetic algorithm and machine learning as described in the invention.

A parallel analog circuit optimization method based on genetic algorithm and machine learning, which uses a fifth-order complex filter circuit as shown in FIG. 2. The circuit comprises the first low pass filter, the second low pass filter, and the coupling connection unit, wherein both the first low pass filter and the second low pass filter are fifth-order active RC low pass filters, and the coupling connection unit consists of 5 sets of coupling resistors. The design objectives of the fifth-order complex filter are as listed in Table 1.

TABLE 1

| Circuit performance | Design index |
| --- | --- |
| Passband ripple | Minimization |
| Bandwidth | 9 ± 5% MHz |
| Center frequency | 12.24 ± 5% MHz |

Figure 1:
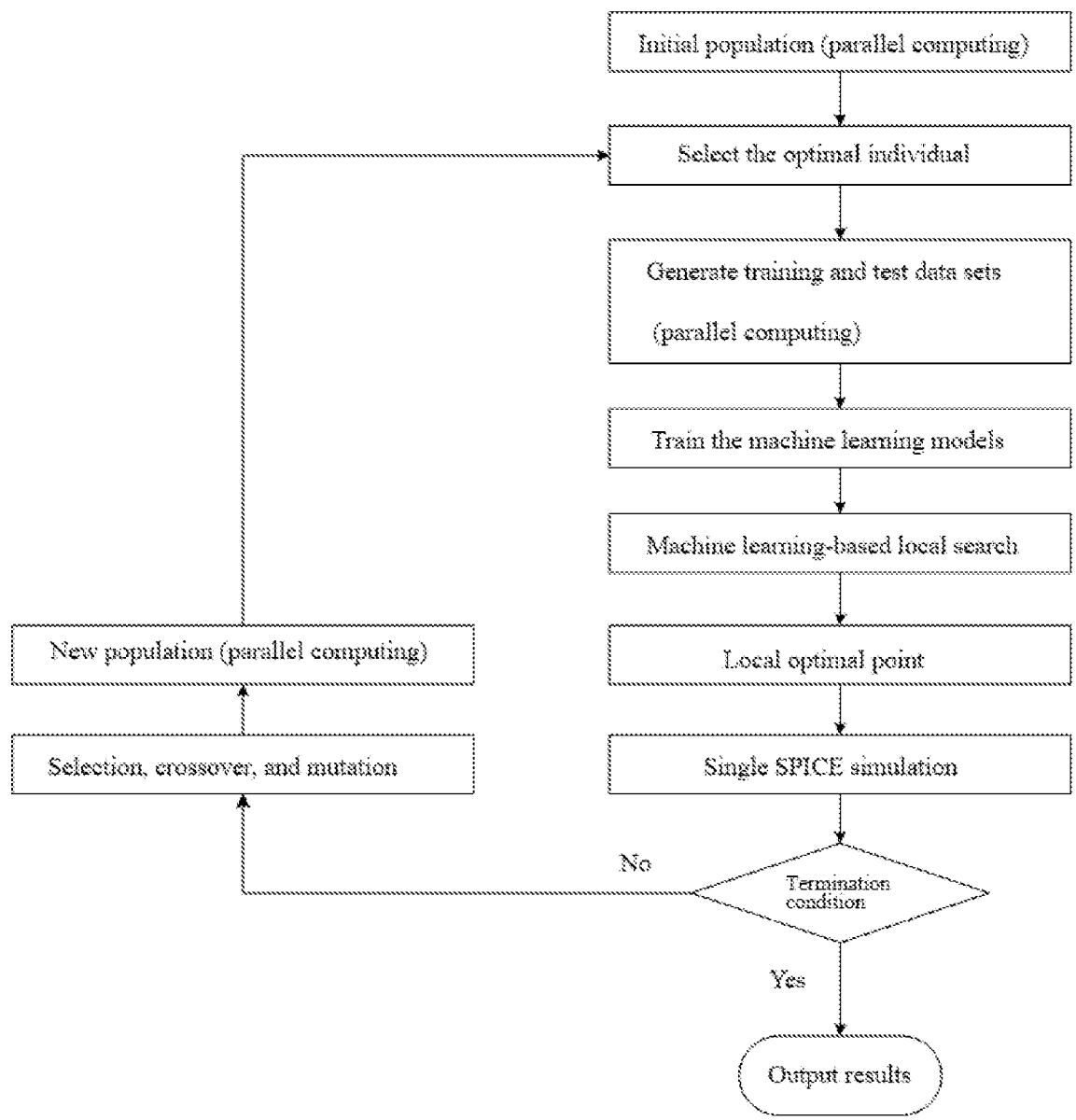
FIG. 1 shows the process diagram of the parallel analog circuit optimization method based on genetic algorithm and machine learning as described in the invention.

In other words, the optimization objective of the embodiment is to minimize the passband ripple while guaranteeing a center frequency of 12.24 MHz and a bandwidth of 9 MHz (within 5% deviation). To this end, the resistance values of 5 sets of coupling resistors $R_1$, $R_2$, $R_3$, $R_4$, $R_5$ are selected as the circuit design variables to be optimized. The specific implementation steps are as follows: as shown in the attached FIG. 1;

(1) Generate the initial population: Sampling is done in the design space according to the orthogonal Latin square principle and the obtained data forms the initial population. The sampling refers to the process of selecting multiple sets of variable values in the design space. The sampled data includes multiple sets of circuit design variable values, each of which contains the values of each design variable.

SPICE simulations are carried out multiple times for the initial population simultaneously with the SPICE simulator and combined with the parallel technique, that is to say, parallel SPICE simulations are performed. As the initial population contains multiple sets of variable values, SPICE simulations are done for each of them in order to evaluate its performance in the population, and multiple SPICE simulations are performed synchronously to obtain the circuit performance parameters of each individual in the initial population. Each set of circuit design variable values in the initial population is referred to as an individual, while each circuit performance value is referred to as a circuit performance parameter, such as gain of operational amplifier, bandwidth, and passband ripple of complex filter, etc. The circuit performance parameters are determined by the optimized target circuit.

The initial population of the genetic algorithm is generated by orthogonal Latin square sampling, which can reduce the number of individuals in the required population and have the individuals distributed as evenly as possible in the design space. Through combining SPICE simulation with parallel computing, the circuit performance of many individuals in the population is to be evaluated via parallel SPICE simulations, which has improved the efficiency greatly.

(2) Each individual's cost value is computed, and the individual with the lowest cost value in the population is selected as the optimal individual:

The SPICE simulation results obtained from Step (1), namely the circuit performance parameters of each individual in the initial population, are put into the cost function to calculate the cost $F_{cost}$ value (cost value) of each individual in the population. The cost value is used to measure the circuit performance. The individual with the lowest cost value is the optimal individual of the population. The cost function $F_{cost}$ is as shown in equation (I):

$$F_{cost} = \Sigma_{n=1}^{N}(W_n * P_n) \quad (I)$$

In equation (1), N indicates the number of performance indexes to be optimized of the circuit (n=1,2, ... N); $P_n$ indicates the square of the difference between the SPICE simulation result and the circuit performance parameter for the nth circuit performance parameter, and $W_n$ is a weight value that indicates the importance of the nth circuit performance parameter (the value of $W_n$ is to be set by the users according to needs and must be a real number).

(3) Training and test data sets are generated for training machine learning-based circuit performance models: this is to perform uniform sampling and obtain sample data in the neighborhood of the optimal individual selected in Step (2) through use of the orthogonal Latin square principle, wherein the neighborhood indicates a range within 5% of the circuit performance parameters of the optimal individual or a user-defined range; and conduct SPICE simulations multiple times for the sampled data in the neighborhood of the optimal individual simultaneously, namely parallel SPICE simulations, with the SPICE simulator combined with the parallel technique to obtain the simulation results. The sampled data and the simulation constitute the training and test data sets jointly. Compared to serial simulations, parallel SPICE simulations can reduce time costs and improve the optimization efficiency.

(4) The training and test data sets obtained from Step (3) are used to train and generate the machine learning-based circuit performance model:

The training and test data sets obtained from Step (3) are used to train models. The machine learning-based circuit performance model refers to a mathematical model established in a local range near the global optimal point based on the machine learning algorithm. It can reflect the relations between circuit design parameters and performance indexes. Since the said machine learning model is established in a local region, the training data required by it is less than that needed by the model built in the global scope, which thus can reduce the time costs. Additionally, as the circuit performance is relatively stable in a local region, the machine learning model established in this way has a higher accuracy, which is conductive to the improvement of the accuracy of the analog circuit optimization method. During the local optimization, the established machine learning model will be used in replacement of the SPICE simulator to evaluate the circuit performance. The machine learning model can predict much faster than SPICE simulation, and thus can greatly improve the efficiency.

(5) Local optimization is to be done based on the well-trained machine learning-based circuit performance model from Step (4):

A search is carried out in the neighborhood of the optimal individual obtained by the global search, aiming to further search for points with better performance and lower cost values. Then, the circuit performance is no longer evaluated through SPICE simulation, and instead, is predicted with the well-trained machine learning-based circuit performance model from Step (4). Namely, the circuit performance model runs with the circuit design variable values as input items, and then outputs the results as circuit performance parameters. The cost value is calculated with the computational formula as shown in equation (I) based on the circuit performance parameters output by the circuit performance model. The local search is carried out in the direction where the cost value decreases.

(6) SPICE simulation verification is done for the results obtained by the local optimization of machine learning-based circuit performance model from Step (5) to improve the accuracy of the optimization results in the previous step. Then, the optimal individual in the initial population is updated with the circuit design variable values and simulation results after the SPICE simulation verification, which is to replace the original value with the current value. The SPICE simulation verification aims to improve the accuracy of the optimization results based on machine model local optimization. The local optimization results after SPICE verification are added to the next-generation population to get a better population.

(7) Determine whether the optimization termination condition is met. If the pre-set iteration times are reached or the goal of circuit optimization is met, then the optimization is finished. If not, Step (8) is entered.

(8) Enter the evolutionary process of the genetic algorithm: A new population is generated through selection, crossover and mutation. The said selection is to select excellent individuals from the population according to the cost values, namely the smaller the cost value, the more likely the individual is to be selected. The said crossover is to select a pair of individuals randomly from the population according to the pre-set probabilities, namely two sets of parameter values of the circuit are randomly selected, and then utilize the crossover operator to cross over them and generate new individuals. The said mutation is to use the mutation operator to mutate some values of the individuals in a population to produce new individuals;

(9) Parallel SPICE simulations are performed for the new population generated by Step (8) with the SPICE simulator combined with the parallel computing technique;

(10) Repeat Step (2) to Step (7).

In the embodiment, the average relative error and the correlation coefficient are used to evaluate the accuracy of the machine learning-based circuit performance model. Computational formulas of the average relative error and the correlation coefficient are as shown in Equations (II) and (III):

$$\text{Average Relative Error} = \frac{\sum_{1}^{n}|x-y|}{\sum_{1}^{n}y} \quad (II)$$

$$\text{Correlation Coefficient} = \frac{n\sum xy - \sum x \sum y}{\sqrt{\left[n\sum x^2 - \left(\sum x\right)^2\right]\left[n\sum y^2 - \left(\sum y\right)^2\right]}} \quad (III)$$

Where: n, x, and y denote the size of the training data set, the predicted value of the machine learning model, and the SPICE simulation result respectively. The average relative error represents the error between the output of the machine learning model and the value of the SPICE simulation result.

The correlation coefficient is a statistical index that measures the goodness of fit between the output of the machine learning model and the value of the SPICE simulation result. If the correlation coefficient is equal to 1.0, the model output value matches the target value (SPICE simulation value) perfectly.

To select an appropriate machine learning model, the embodiment has compared six common machine learning models, including K-Nearest Neighbor (KNN) model, Support Vector Machine (SVM) model, Deep Neural Networks (DNN) model, Random Forests model, Decision Trees (DT) model, and Artificial Neutral Networks (ANN) model, according to the above formulas. The embodiment uses 10 training and test data sets which are generated through SPICE simulations to train and test these six models. The minimum values, maximum values, and averages of the average relative errors and correlation coefficients of the six models, as well as the training time of the models are as listed in Table 2.

plex bandpass filter. The smaller the cost value, the better the circuit performance is. The optimization results of the three optimization methods are as listed in Table 3.

TABLE 3

| Optimization method | Passband ripple (dB) | Center frequency (MHz) | Bandwidth (MHz) | Running time |
|---|---|---|---|---|
| GA(SPICE) | 0.987 | 12.20 | 9.3 | 0:14:00 |
| GA(SPICE) + LMS(SPICE) | 0.479 | 12.24 | 9.3 | 2:56:00 |
| GA(SPICE) + LMS(ANN) | 0.577 | 12.24 | 9.3 | 0:42:00 |

Figure 3:
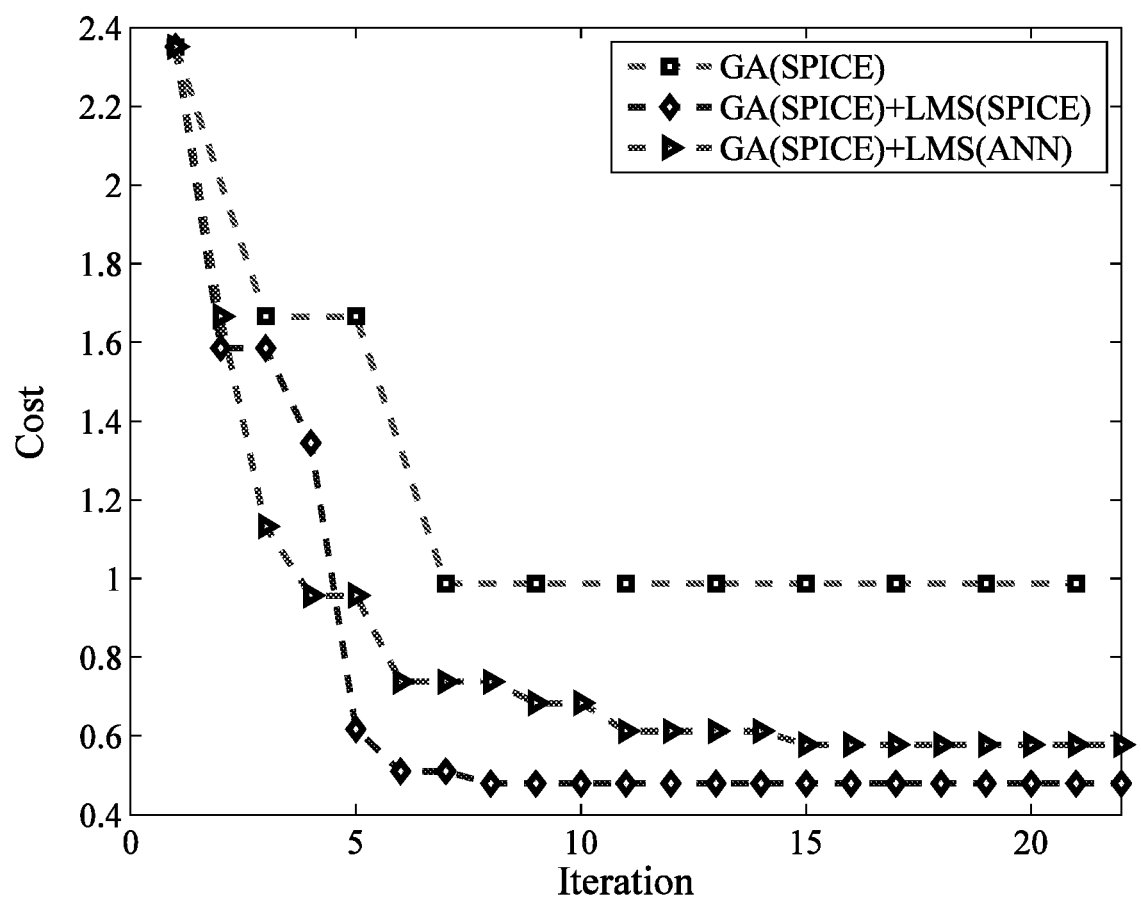
FIG. 3 shows the cost value changing curve in the optimization process of Embodiment 1 with the parallel analog circuit optimization method based on genetic algorithm and machine learning as described in the invention

As can be seen from FIG. 3 in combination with Table 3, the optimization method based on genetic algorithm (GA (SPICE)) has poor optimization effects with the largest passband ripple of complex bandpass filter which is about

TABLE 2

| Model | Main model parameters | Training time (sec) | Data set | Average relative error (%) | | | Correlation coefficient | | |
|---|---|---|---|---|---|---|---|---|---|
| | | | | Minimum value | Maximum value | Average | Minimum value | Maximum value | Average |
| KNN | k = 1 | 0.2929 | Training set | — | — | — | — | — | — |
| | | | Test set | 0.9236 | 5.7663 | 2.9142 | 0.9560 | 0.9990 | 0.9829 |
| SVR | C = 1000, 'RBF' | 0.2980 | Training set | 2.3879 | 14.934 | 6.6970 | 0.6036 | 0.9958 | 0.8290 |
| | | | Test set | 2.1111 | 13.013 | 6.3128 | 0.4453 | 0.9972 | 0.8657 |
| DNN | [128, 128, 128, 128, 128], 'ReLu','Adam' | 687.18 | Training set | 0.2273 | 1.5794 | 0.6844 | 0.9994 | 0.9999 | 0.9985 |
| | | | Test set | 0.2277 | 2.2103 | 0.9386 | 0.9989 | 0.9998 | 0.9973 |
| DT | — | 0.2975 | Training set | — | — | — | — | — | — |
| | | | Test set | 1.3901 | 14.047 | 5.7461 | 0.7556 | 0.9944 | 0.9088 |
| Random Forests | n_estimators = 30 | 0.3307 | Training set | 1.0932 | 3.3700 | 1.8993 | 0.9898 | 0.9961 | 0.9912 |
| | | | Test set | 2.2120 | 9.7492 | 4.1453 | 0.9323 | 0.9956 | 0.9671 |
| ANN | [8], 'tansig', 'trainlm' | 0.2822 | Training set | 0.1000 | 1.2600 | 0.5970 | 0.9969 | 1.0000 | 0.9989 |
| | | | Test set | 0.1500 | 1.7300 | 0.7870 | 0.9954 | 1.0000 | 0.9986 |

As can be seen from Table 2, the ANN model has the smallest relative error (2%), and the largest correlation coefficient (very close to 1.0) among the six models. That is to say, in this embodiment, the ANN model has the highest accuracy. In addition, the training time of ANN model is also very short. Through overall consideration, the embodiment selects the ANN model as its training model.

The embodiment compares the following three optimization methods: global optimization method based on genetic algorithm and SPICE parallel simulation (GA(SPICE)), global optimization based on genetic algorithm and SPICE parallel simulation plus local optimization based on SPICE simulation method(GA(SPICE)+LMS(SPICE)), and global optimization based on genetic algorithm plus local optimization based on artificial neural networks method(GA(SPICE)+LMS(ANN)). Among them, the second optimization method has the highest accuracy and the best optimization effects theoretically as it is based on SPICE simulation and has combined global optimization and local optimization.

The fifth order complex bandpass filter used in this embodiment adopts the 130 nm CMOS technology. The three optimization methods all run in a server environment with 80 Intel Xeon 1.9-ghz CPU cores and a 125-GB storage space. FIG. 3 shows the changing trends of the cost values of the three analog circuit optimization methods, with the horizontal axis Iteration denoting the iteration times and the cost value proportional to the passband ripple of the comtwice that of the second optimization method, though it consumes the shortest time. Also, the GA (SPICE) optimization method converges earlier than the other two methods. This is because although the genetic algorithm is a powerful global optimization algorithm, its local optimization ability is limited. Therefore, local optimization is an indispensable part. The second method, global optimization based on genetic algorithm and SPICE parallel simulation plus local optimization based on SPICE simulation method (GA (SPICE)+LMS(SPICE)) has the best optimization effects with the smallest passband ripple of complex bandpass filter, but consumes the longest time. The optimization method based on genetic algorithm and artificial neural networks (GA(SPICE)+LMS(ANN)) is close the second optimization method in accuracy, and takes only about a quarter of the time required by the second optimization method, which has greatly improved the efficiency. This indicates that the optimization method based on genetic algorithm and machine learning has considered both accuracy and efficiency.

Embodiment 2

Figure 4:
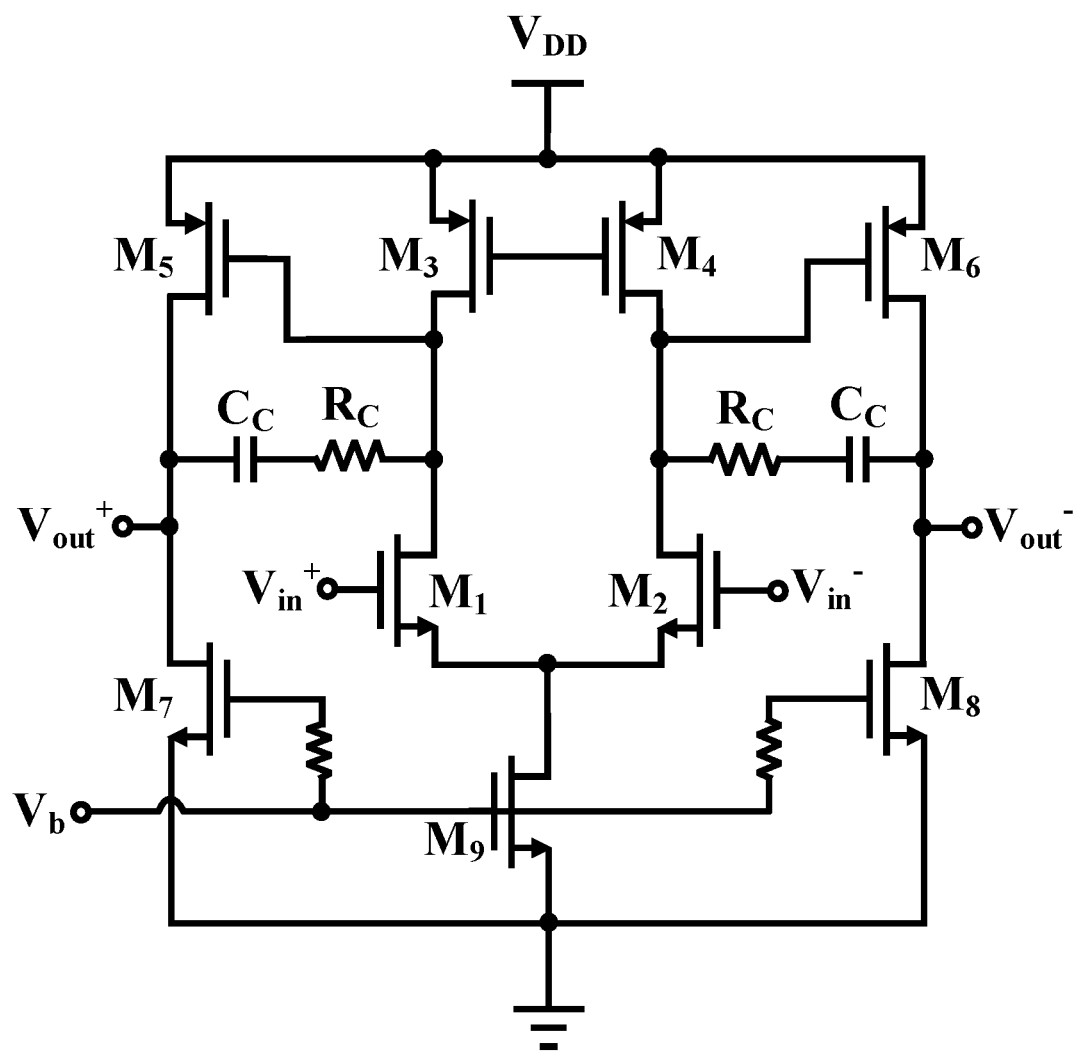
FIG. 4 shows the structure diagram of the second-order operational amplifier circuit in Embodiment 2 of the parallel analog circuit optimization method based on genetic algorithm and machine learning as described in the invention.

A parallel analog circuit optimization method based on genetic algorithm and machine learning, which uses a second-order differential operational amplifier circuit as shown in FIG. 4. The circuit is a fully differential second-order operational amplifier circuit used to realize high gain and high linearity, the compensation network in which comprises a miller compensation capacitor and a zero-regulator resistor for improving phase margin.

The optimization indexes of the operational amplifier circuit are as listed in Table 4.

TABLE 4

| Circuit performance | Design indexes |
| --- | --- |
| Open-loop gain | Maximization |
| Bandwidth | Maximization |
| Unity-gain bandwidth | >1 GHz |
| Phase margin | >60° |

In other words, the optimization objective of the embodiment is to maximize the open-loop gain and the bandwidth under the condition of satisfying the unity-gain bandwidth and the phase margin. According to the symmetry requirements, transistors $M_2$, $M_4$, $M_G$, and $M_8$ must be the same as $M_1$, $M_3$, $M_5$, and $M_7$ respectively, namely the following relations shall exist with their widths: $W_1=W_2$, $W_3=W_4$, $W_5=W_6$, and $W_7=W_8$. Additionally, compensation capacitor $C_C$ and compensation resistor $R_C$ also need to be optimized. Therefore, there are seven design variables in total to be optimized, respectively $W_1$, $W_3$, $W_5$, $W_7$, $W_9$, $C_C$, and $R_C$.

(1) Generate the initial population: Sampling is done in the design space according to the orthogonal Latin square principle and the obtained data forms the initial population. The sampling refers to the process of selecting multiple sets of variable values in the design space. The sampled data includes multiple sets of circuit design variable values, each of which contains the values of each design variable.

SPICE simulations are carried out multiple times for the initial population simultaneously with the SPICE simulator and combined with the parallel technique, that is to say, parallel SPICE simulations are performed. As the initial population contains multiple sets of variable values, SPICE simulations are done for each of them in order to evaluate its performance in the population, and multiple SPICE simulations are performed synchronously to obtain the circuit performance parameters of each individual in the initial population. Each set of circuit design variable values in the initial population is referred to as an individual, while each circuit performance value is referred to as a circuit performance parameter, such as gain of operational amplifier, bandwidth, and passband ripple of complex filter, etc. The circuit performance parameters are determined by the optimized target circuit.

The initial population of the genetic algorithm is generated by orthogonal Latin square sampling, which can reduce the number of individuals in the required population and have the individuals distributed as evenly as possible in the design space. Through combining SPICE simulation with parallel computing, the circuit performance of many individuals in the population is to be evaluated via parallel SPICE simulations, which has improved the efficiency greatly.

(2) Each individual's cost value is computed, and the individual with the lowest cost value in the population is selected as the optimal individual:

The SPICE simulation results obtained from Step (1), namely the circuit performance parameters of each individual in the initial population, are put into the cost function to calculate the cost value $F_{cost}$ (cost value) of each individual in the population. The cost value is used to measure the circuit performance. The individual with the lowest cost value is the optimal individual of the population. The cost function $F_{cost}$ is as shown in equation (I):

$$F_{cost}=\Sigma_{n=1}^{N}(W_n*P_n) \quad (I)$$

In equation (1), N indicates the number of performance indexes to be optimized of the circuit (n=1,2, ... N); $P_n$ indicates the square of the difference between the SPICE simulation result and the circuit performance parameter for the nth circuit performance parameter, and $W_n$ is a weight value that indicates the importance of the nth circuit performance parameter (the value of $W_n$ is to be set by the users according to needs and must be a real number).

(3) Training and test data sets are generated for training machine learning-based circuit performance models: this is to perform uniform sampling and obtain sample data in the neighborhood of the optimal individual selected in Step (2) through use of the orthogonal Latin square principle, wherein the neighborhood indicates a range within 5% of the circuit performance parameters of the optimal individual or a user-defined range; and conduct SPICE simulations multiple times for the sampled data in the neighborhood of the optimal individual simultaneously, namely parallel SPICE simulations, with the SPICE simulator combined with the parallel technique to obtain the simulation results. The sampled data and the simulation constitute the training and test data sets jointly. Compared to serial simulations, parallel SPICE simulations can reduce time costs and improve the optimization efficiency.

(4) The training and test data sets obtained from Step (3) are used to train and generate the machine learning-based circuit performance model:

The training and test data sets obtained from Step (3) are used to train models. The machine learning-based circuit performance model refers to a mathematical model established in a local range near the global optimal point based on the machine learning algorithm. It can reflect the relations between circuit design parameters and performance indexes. Since the said machine learning model is established in a local region, the training data required by it is less than that needed by the model built in the global scope, which thus can reduce the time costs. Additionally, as the circuit performance is relatively stable in a local region, the machine learning model established in this way has a higher accuracy, which is conductive to the improvement of the accuracy of the analog circuit optimization method. During the local optimization, the established machine learning model will be used in replacement of the SPICE simulator to evaluate the circuit performance. The machine learning model can predict much faster than SPICE simulation, and thus can greatly improve the efficiency.

(5) Local optimization is to be done based on the well-trained machine learning-based circuit performance model from Step (4):

A search is carried out in the neighborhood of the optimal individual obtained by the global search, aiming to further search for points with better performance and lower cost values. Then, the circuit performance is no longer evaluated through SPICE simulation, and instead, is predicted with the well-trained machine learning-based circuit performance model from Step (4). Namely, the circuit performance model runs with the circuit design variable values as input items, and then outputs the results as circuit performance parameters. The cost value is calculated with the computational formula as shown in equation (I) based on the circuit performance parameters output by the circuit performance model. The local search is carried out in the direction where the cost value decreases.

(6) SPICE simulation verification is done for the results obtained by the local optimization of machine learning-based circuit performance model from Step (5) to improve the accuracy of the optimization results in the previous step. Then, the optimal individual in the initial population is updated with the circuit design variable values and simulation results after the SPICE simulation verification, which is to replace the original value with the current value. The SPICE simulation verification aims to improve the accuracy of the optimization results based on machine model local optimization. The local optimization results after SPICE verification are added to the next-generation population to get a better population.

(7) Determine whether the optimization termination condition is met. If the pre-set iteration times are reached or the goal of circuit optimization is met, then the optimization is finished. If not, Step (8) is entered.

(8) Enter the evolutionary process of the genetic algorithm: A new population is generated through selection, crossover and mutation. The said selection is to select excellent individuals from the population according to the cost values, namely the smaller the cost value, the more likely the individual is to be selected. The said crossover is to select a pair of individuals randomly from the population according to the pre-set probabilities, namely two sets of parameter values of the circuit are randomly selected, and then utilize the crossover operator to cross over them and generate new individuals. The said mutation is to use the mutation operator to mutate some values of the individuals in a population to produce new individuals;

(9) Parallel SPICE simulations are performed for the new population generated by Step (8) with the SPICE simulator combined with the parallel computing technique;

(10) Repeat Step (2) to Step (7).

To select an appropriate machine learning model, the embodiment has compared six common machine learning models, including K-Nearest Neighbor (KNN) model, Support Vector Machine (SVM) model, Deep Neural Networks (DNN) model, Random Forests model, Decision Trees (DT) model, and Artificial Neutral Networks (ANN) model. The embodiment compares the accuracy of the six machine learning models from the four perspectives of gain of operational amplifier, bandwidth, unity-gain bandwidth, and phase margin. The embodiment uses 10 training and test data sets which are generated through SPICE simulations to train and test each of these models. The minimum values, maximum values, and averages of the average relative errors and correlation coefficients of the six models from the four perspectives of gain of operational amplifier, bandwidth, unity-gain bandwidth, and phase margin in the embodiment are as listed in Table 5, Table 6, Table 7 and Table 8. In addition, Table 5 through Table 8 also list the training time of each model.

TABLE 5

| Model | Main model parameters | Training time (sec) | Data set | Average relative error (%) | | | Correlation coefficient | | |
|---|---|---|---|---|---|---|---|---|---|
| | | | | Minimum value | Maximum value | Average | Minimum value | Maximum value | Average |
| KNN | k = 1 | 0.2905 | Training set | — | — | — | — | — | — |
| | | | Test set | 0.0250 | 0.1514 | 0.0885 | 0.9949 | 0.9999 | 0.9982 |
| SVR | C = 1000, 'RBF' | 0.3043 | Training set | 0.0283 | 0.0608 | 0.0442 | 0.9940 | 0.9993 | 0.9970 |
| | | | Test set | 0.0568 | 0.1047 | 0.0821 | 0.9936 | 0.9994 | 0.9977 |
| DNN | [64, 64, 64, 64, 64], 'ReLu', 'Adam' | 54.306 | Training set | 0.0312 | 0.1199 | 0.0578 | 0.9745 | 0.9993 | 0.9944 |
| | | | Test set | 0.0398 | 0.1273 | 0.0676 | 0.9885 | 0.9996 | 0.9977 |
| DT | — | 0.2627 | Training set | — | — | — | — | — | — |
| | | | Test set | 0.0463 | 0.2628 | 0.1547 | 0.9387 | 0.9990 | 0.9739 |
| Random Forests | n_estimators = 30 | 0.3084 | Training set | 0.0433 | 0.0833 | 0.0617 | 0.9915 | 0.9977 | 0.9952 |
| | | | Test set | 0.1139 | 0.2359 | 0.1690 | 0.9760 | 0.9933 | 0.9872 |
| ANN | [8], 'tansig', 'trainlm' | 0.3736 | Training set | 0.0104 | 0.0214 | 0.0106 | 0.9990 | 1.0000 | 0.9997 |
| | | | Test set | 0.0152 | 0.0326 | 0.0207 | 0.9989 | 1.0000 | 0.9995 |

TABLE 6

| Model | Main model parameters | Training time (sec) | Data set | Average relative error (%) | | | Correlation coefficient | | |
|---|---|---|---|---|---|---|---|---|---|
| | | | | Minimum value | Maximum value | Average | Minimum value | Maximum value | Average |
| KNN | k = 1 | 0.2923 | Training set | — | — | — | — | — | — |
| | | | Test set | 0.2191 | 0.2937 | 0.2573 | 0.9970 | 0.999 | 0.9989 |
| SVR | C = 1000, 'RBF' | 0.2840 | Training set | 0.0383 | 0.1346 | 0.0609 | 0.9972 | 0.9998 | 0.9992 |
| | | | Test set | 0.0760 | 0.3196 | 0.1350 | 0.9972 | 0.9996 | 0.9985 |
| DNN | [64, 64, 64, 64, 64], 'ReLu', 'Adam' | 54.601 | Training set | 0.0471 | 0.1220 | 0.0737 | 0.9972 | 0.9995 | 0.9986 |
| | | | Test set | 0.0563 | 0.1524 | 0.1056 | 0.9930 | 0.9998 | 0.9981 |
| DT | — | 0.2711 | Training set | — | — | — | — | — | — |
| | | | Test set | 0.2231 | 0.7051 | 0.4540 | 0.8489 | 0.9984 | 0.9386 |
| Random Forests | n_estimators = 30 | 0.3058 | Training set | 0.1208 | 0.1358 | 0.1291 | 0.9941 | 0.9966 | 0.9956 |
| | | | Test set | 0.3356 | 0.4618 | 0.3894 | 0.9720 | 0.9961 | 0.9849 |
| ANN | [8], 'tansig', 'trainlm' | 0.3303 | Training set | 0.0078 | 0.0857 | 0.0293 | 0.9990 | 1.0000 | 0.9997 |
| | | | Test set | 0.0135 | 0.1200 | 0.0376 | 0.9990 | 0.9999 | 0.9995 |

TABLE 7

| Model | Main model parameters | Training time (sec) | Data set | Average relative error (%) | | | Correlation coefficient | | |
|---|---|---|---|---|---|---|---|---|---|
| | | | | Minimum value | Maximum value | Average | Minimum value | Maximum value | Average |
| KNN | k = 1 | 0.2947 | Training set | — | — | — | — | — | — |
| | | | Test set | 3.1062 | 4.3661 | 3.8100 | 0.9835 | 0.9999 | 0.9904 |
| SVR | C = 1000, 'RBF' | 0.3113 | Training set | 4.6467 | 5.2512 | 5.0144 | 0.9847 | 0.9931 | 0.9894 |
| | | | Test set | 3.5008 | 4.4419 | 4.0178 | 0.9918 | 0.9962 | 0.9940 |
| DNN | [64, 64, 64, 64, 64], 'ReLu', 'Adam' | 54.208 | Training set | 0.1284 | 0.5980 | 0.2530 | 0.9979 | 1.0000 | 0.9996 |
| | | | Test set | 0.1768 | 0.9245 | 0.3257 | 0.9973 | 1.0000 | 0.9996 |
| DT | — | 0.2711 | Training set | — | — | — | — | — | — |
| | | | Test set | 2.0015 | 2.7802 | 2.4158 | 0.9657 | 0.9859 | 0.9776 |
| Random Forests | n_estimators = 30 | 0.3281 | Training set | 0.6553 | 0.7963 | 0.7266 | 0.9972 | 0.9986 | 0.9980 |
| | | | Test set | 1.2873 | 1.7314 | 1..5160 | 0.9881 | 0.9953 | 0.9923 |
| ANN | [8], 'tansig', 'trainlm' | 0.1764 | Training set | 0.0563 | 0.4320 | 0.2181 | 0.9999 | 1.0000 | 1.0000 |
| | | | Test set | 0.0876 | 0.4938 | 0.2314 | 0.9999 | 1.0000 | 1.0000 |

TABLE 8

| Model | Main model parameters | Training time (sec) | Data set | Average relative error (%) | | | Correlation coefficient | | |
|---|---|---|---|---|---|---|---|---|---|
| | | | | Minimum value | Maximum value | Average | Minimum value | Maximum value | Average |
| KNN | k = 1 | 0.2986 | Training set | — | — | — | — | — | — |
| | | | Test set | 3.5797 | 4.0517 | 3.7478 | 0.9832 | 0.9996 | 0.9931 |
| SVR | C = 1000, 'RBF' | 0.3068 | Training set | 0.4511 | 1.2788 | 0.9022 | 0.9957 | 0.9992 | 0.9974 |
| | | | Test set | 0.3937 | 1.3538 | 0.8697 | 0.9950 | 0.9992 | 0.9974 |
| DNN | [64, 64, 64, 64, 64], 'ReLu', 'Adam' | 14.846 | Training set | 0.1803 | 2.0427 | 0.6062 | 0.9863 | 0.9999 | 0.9978 |
| | | | Test set | 0.2136 | 17.951 | 2.5033 | 0.9918 | 0.9998 | 0.9985 |
| DT | — | 0.2835 | Training set | — | — | — | — | — | — |
| | | | Test set | 2.1589 | 2.9769 | 2.5648 | 0.9686 | 0.9845 | 0.9777 |
| Random Forests | n_estimators = 30 | 0.3315 | Training set | 0.6228 | 0.8214 | 0.7240 | 0.9972 | 0.9987 | 0.9980 |
| | | | Test set | 1.3188 | 1.8520 | 1.5429 | 0.9898 | 0.9951 | 0.9924 |
| ANN | [8], 'tansig', 'trainlm' | 0.2877 | Training set | 0.1728 | 0.4435 | 0.2946 | 0.9993 | 0.9999 | 0.9996 |
| | | | Test set | 0.2437 | 0.7589 | 0.3857 | 0.9990 | 0.9998 | 0.9994 |

As can be seen from Table 5 through Table 8, the ANN model has the smallest relative error (2%), and the largest correlation coefficient (very close to 1.0) among the six models. That is to say, in this embodiment, the ANN model has the highest accuracy. In addition, the training time of ANN model is also very short. Through overall consideration, the embodiment selects the ANN model as its training model.

Figure 5:
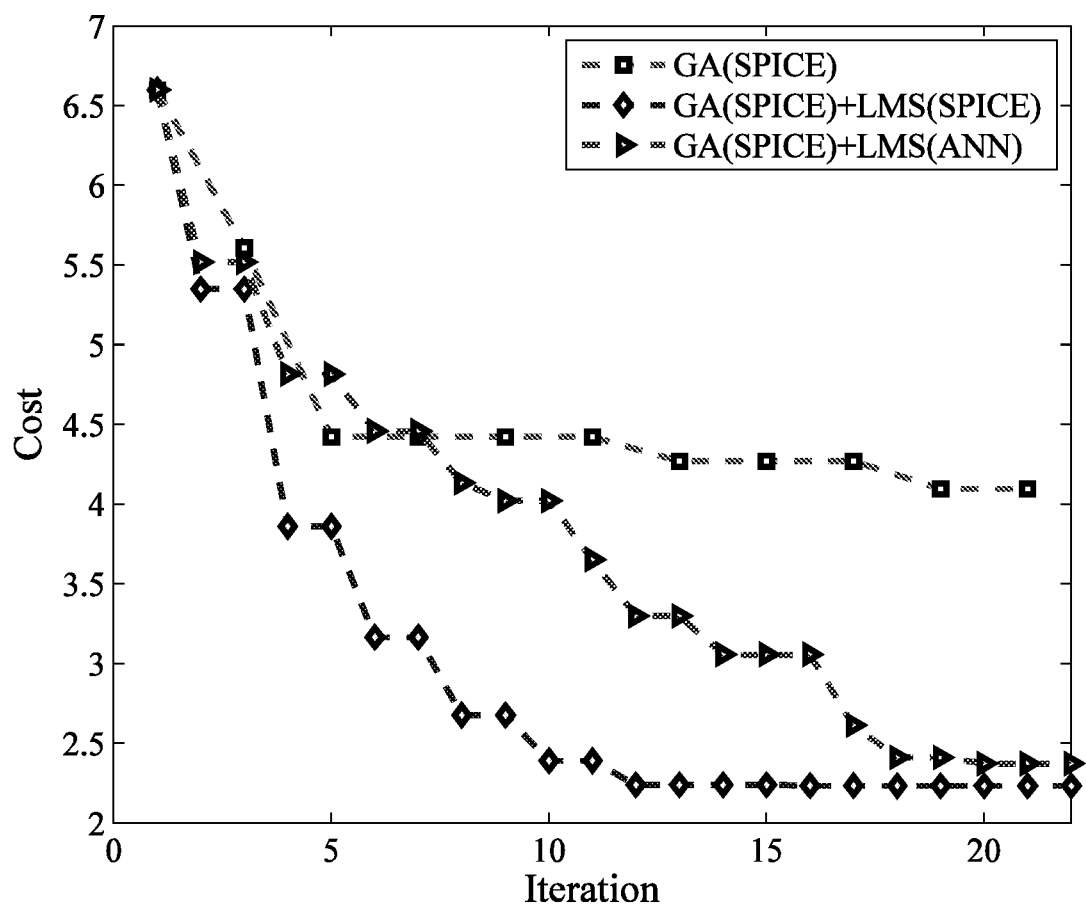
FIG. 5 shows the cost value changing curve in the optimization process of Embodiment 2 with the parallel analog circuit optimization method based on genetic algorithm and machine learning as described in the invention

The optimization steps in this embodiment are the same as those of Embodiment 1. The embodiment also compares the three optimization methods as described in Embodiment 1. The operational amplifier used in this embodiment adopts the 130 nm CMOS technology. The three optimization methods all run in a server environment with 80 Intel Xeon 1.9-ghz CPU cores and a 125-GB storage space. FIG. 5 shows the changing trends of the cost values of the three optimization methods for the operational amplifier. The cost value is used to evaluate the circuit performance, namely the smaller the cost value, the better the circuit performance is.

Table 9 lists the optimization results of the three optimization methods.

TABLE 9

| Optimization method | Open-loop gain (V/V) | Bandwidth (KHz) | Unit gain bandwidth (GHz) | Phase margin (°) | Running time |
|---|---|---|---|---|---|
| GA(SPICE) | 689.088 | 835.455 | 1.151 | 60.457 | 0:5:48 |
| GA(SPICE) + LMS(SPICE) | 709.430 | 1345.455 | 1.177 | 60.007 | 1:36:00 |

TABLE 9-continued

| Optimization method | Open-loop gain (V/V) | Bandwidth (KHz) | Unit gain bandwidth (GHz) | Phase margin (°) | Running time |
|---|---|---|---|---|---|
| GA(SPICE) + LMS(ANN) | 684.507 | 1285.953 | 1.246 | 60.221 | 0:21:00 |

As can be seen from FIG. 5 in combination with Table 9, the GA method has poor optimization effects compared to the latter two methods, though it consumes the shortest time, while the GA(SPICE)+LMS(SPICE) method consumes the longest time, though it has the best optimization effects. The parallel automatic analog circuit optimization method based on genetic algorithm and artificial neural network proposed in the invention, namely GA(SPICE)+LMS(ANN), can greatly improve the optimization efficiency while guaranteeing an accuracy comparable to GA(SPICE)+LMS (SPICE) method. It is an optimization method that not only can reach the SPICE-level accuracy, but also can guarantee the optimization efficiency.

What is claimed is:

1. A parallel analog circuit optimization method based on genetic algorithm and machine learning, which comprises the following steps:

(1) generating an initial population by sampling and obtaining sampled data in a design space according to an orthogonal Latin square principle; wherein the design space refers to a value range of circuit design variables, which is to be determined by a user; the sampling refers to a process of selecting multiple sets of variable values in the design space; the sampled data includes multiple sets of circuit design variable values, each set contains values of each design variable;

carrying out SPICE simulations for the initial population with a SPICE simulator and a parallel technique for multiple times; wherein the SPICE simulations are done for each set of design variable values, and multiple SPICE simulations are performed synchronously to obtain circuit performance parameters of each individual in the initial population; each set of circuit design variable values in the initial population is referred to as an individual, while each circuit performance value is referred to as a circuit performance parameter, (2) comparing cost values of individuals, and selecting an individual with a lowest cost value in the initial population as an optimal individual:

(3) generating training and test data sets for a training machine learning-based circuit performance model:

(4) the training and test data sets obtained from step (3) are used for further training and generating the machine learning-based circuit performance model;

wherein the machine learning-based circuit performance model refers to a mathematical model established in a local range near a global optimal point based on a machine learning algorithm; the machine learning-based circuit performance model contains relations between circuit design parameters and performance indexes;

(5) performing a local optimization based on a well-trained machine learning-based circuit performance model from step (4) by carrying out a search in a neighborhood of the optimal individual; wherein the well-trained machine learning-based circuit performance model from Step (4) runs with the circuit design variable values as input items, and then outputs local optimization results as the circuit performance parameters; the cost value ($F_{cost}$) is calculated with a computational formula as shown in equation (I) based on the circuit performance parameters;

$$F_{cost} = \Sigma_{n=1}^{N}(W_n * P_n) \quad (I)$$

wherein N indicates a number of performance indexes to be optimized of circuit (n=1,2, ... N); $P_n$ indicates a square of difference between a SPICE simulation result and a circuit performance parameter for nth circuit performance parameter, and $W_n$ is a weight value that indicates an importance of the nth circuit performance parameter (value of $W_n$ is to be set by the user);

and performing -a local search in a direction where the cost value decreases;

(6) performing a SPICE simulation verification on the local optimization results, then, the optimal individual in the initial population is updated with the circuit design variable values and SPICE simulation verification results;

(7) determining optimization condition: if the pre-set iteration times are reached or a goal of circuit optimization is achieved, then the optimization is terminated; otherwise, performing next step;

(8) entering an evolutionary process of a genetic algorithm by generating a new population through selection, crossover and mutation; wherein the selection is to select excellent individuals from a population with low cost values, the individual with the lowest cost value is selected; the crossover is to select a pair of individuals randomly from the population according to pre-set probabilities, and utilizing a crossover operator to cross over the selected pair to generate new individuals; the mutation is to use a mutation operator to mutate some values of the individuals in the population to produce new individuals;

(9) performing SPICE simulations on the new population generated by step (8); and

(10) repeating step (2) to step (7).

2. The parallel analog circuit optimization method according to claim 1, wherein in the step (5), the neighborhood indicates a range within 5% of the circuit performance parameters of the optimal individual or a user-defined range.

3. The parallel analog circuit optimization method according to claim 1, wherein the machine learning-based circuit performance model is selected from the group consisting of an ANN model, a KNN model, an SVM model, a DNN model, a DT model, and a Random Forests model.

* * * * *